United States Patent [19]

Sheedy

[11] Patent Number: 5,219,231
[45] Date of Patent: Jun. 15, 1993

[54] SPLIT RACE BEARING ASSEMBLIES

[75] Inventor: Noel F. Sheedy, Doreen, Australia

[73] Assignee: Plastic Bearing Housing Australiasia PTY Ltd., Doreen, Australia

[21] Appl. No.: 759,779

[22] Filed: Sep. 13, 1991

Related U.S. Application Data

[63] Continuation of Ser. No. 466,289, Apr. 2, 1990, filed as PCT/AU88/00382, Sep. 30, 1988, abandoned.

[30] Foreign Application Priority Data

Oct. 2, 1987 [AU] Australia .................. PI4714
Jun. 10, 1988 [AU] Australia .................. PI8724
Jul. 13, 1988 [AU] Australia .................. PI9251

[51] Int. Cl.$^5$ .................................. F16C 23/04
[52] U.S. Cl. .................... 384/206; 384/192; 384/212; 384/296
[58] Field of Search .................. 384/192-212, 384/275, 295-297, 298-301, 416-418, 495-498, 536, 558

[56] References Cited

U.S. PATENT DOCUMENTS

| | | | |
|---|---|---|---|
| 1,578,237 | 3/1926 | Reynolds | 384/498 |
| 1,973,131 | 9/1934 | Wallgren . | |
| 2,029,600 | 2/1936 | Wallgren et al. . | |
| 2,572,411 | 10/1951 | Watt | 384/536 |
| 2,814,538 | 11/1957 | Connolly | 384/206 |
| 2,886,379 | 5/1959 | Small | 384/207 |
| 3,116,539 | 1/1964 | Evans et al. | 384/206 X |
| 3,224,821 | 12/1965 | Barr | 384/498 X |
| 3,820,861 | 6/1974 | Strang | 384/206 |
| 3,915,518 | 10/1975 | McCloskey | 384/212 |
| 4,603,982 | 8/1986 | Dittrich | 384/297 X |
| 4,620,805 | 11/1986 | Belanger | 384/297 |

FOREIGN PATENT DOCUMENTS

| | | | |
|---|---|---|---|
| 119721 | 3/1945 | Australia . | |
| 124147 | 5/1947 | Australia . | |
| 43097/85 | 12/1985 | Australia . | |
| 0143883 | 6/1985 | European Pat. Off. . | |
| 2946478 | 5/1981 | Fed. Rep. of Germany . | |
| 3139841 | 4/1983 | Fed. Rep. of Germany . | |
| 567905 | 3/1945 | United Kingdom | 384/297 |
| 1101995 | 2/1968 | United Kingdom | 384/206 |

Primary Examiner—Thomas R. Hannon

[57] ABSTRACT

A self-aligning bearing having a first bearing member connected to a rotatable shaft and a stationary second bearing member located around the first bearing member. The second bearing member includes at least two annular rings with mating recesses in each which together define a groove. The first bearing member is provided with a continuous flange located for rotation within the groove when in use. The second bearing member has a convexly curved exterior providing a self-aligning surface for engaging a mating concavely curved surface of a bearing housing.

7 Claims, 2 Drawing Sheets

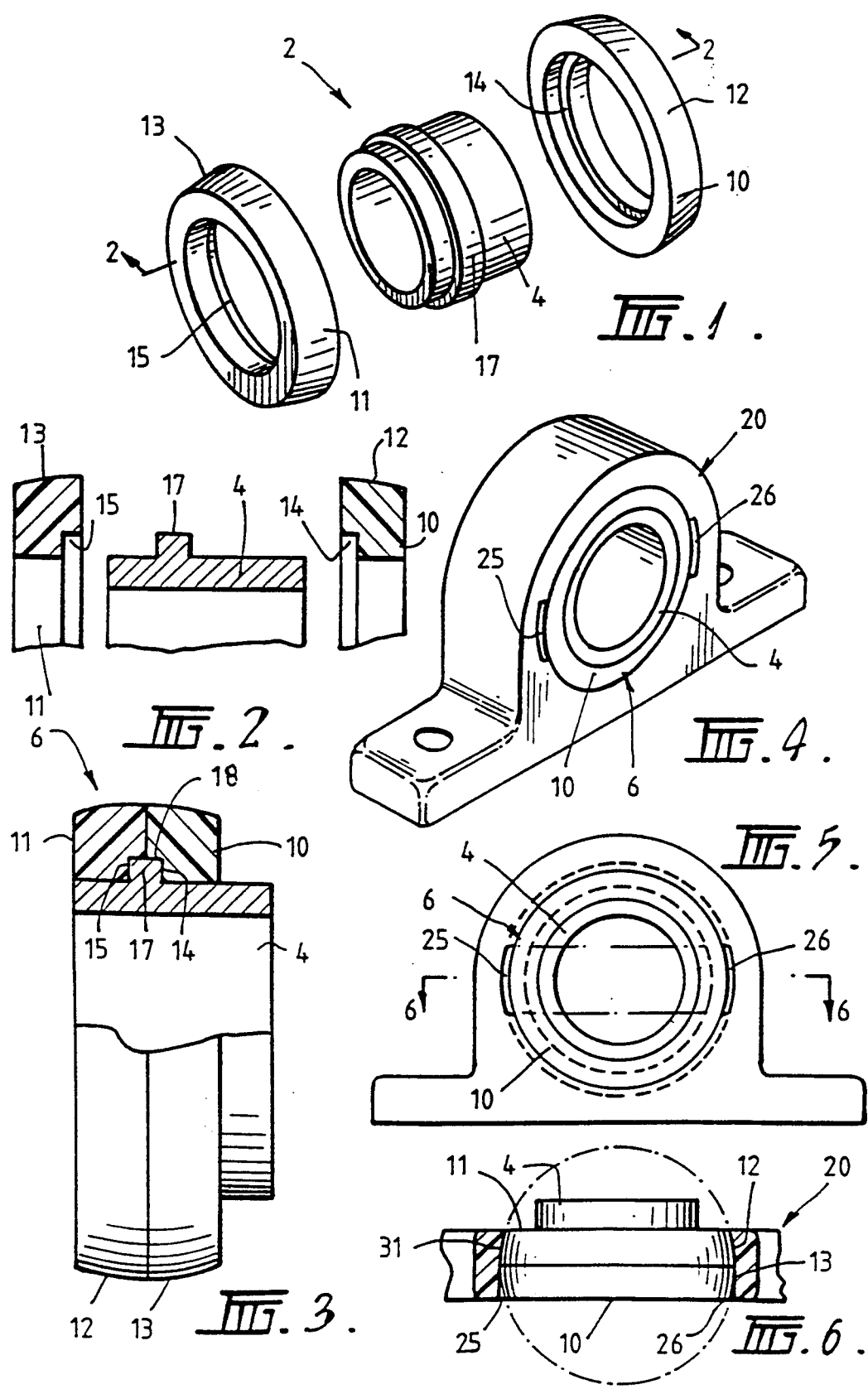

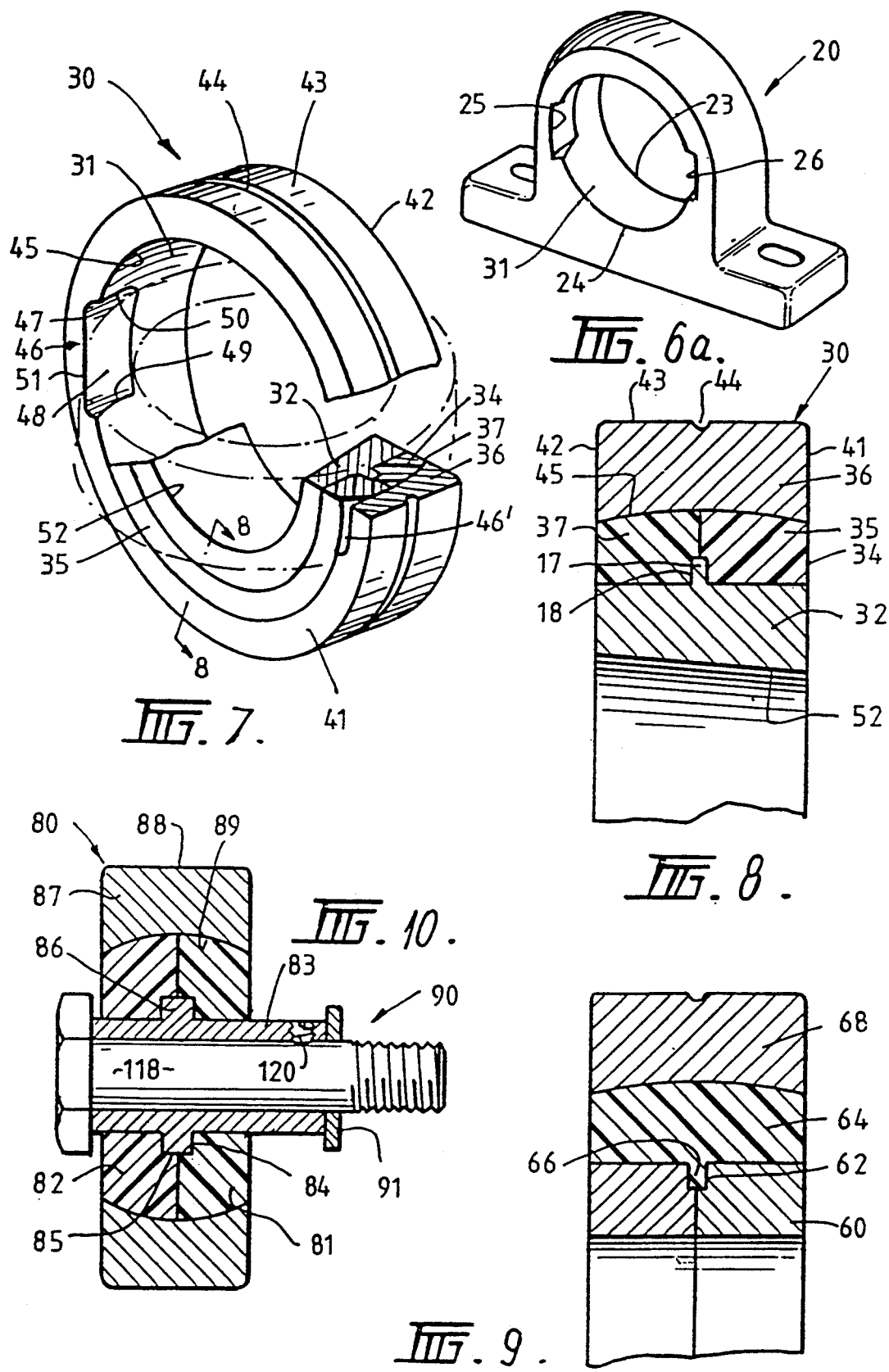

SPLIT RACE BEARING ASSEMBLIES

This application is a continuation of application Ser. No. 07/466,289 filed as Apr. 2, 1990, filed as PCT/AU88/00382, Sep. 30, 1988, now abandoned.

The present invention relates generally to bearings and bearing assemblies including subassemblies and housings, and more particularly to bearings and bearing assemblies in which one of the bearing race members or components is split. More particularly the present invention relates to bearings having complementary mating surfaces, such as for example a male and female arrangement for locating one bearing member with respect to an other bearing member. Even more particularly, the present invention relates to a novel form of bearing which is a replacement for or a substitute for conventional ball or roller bearings.

Although the present invention will be described with particular reference to a bearing having an internally located complementary flange and groove arrangement it is to be noted that the present invention is not so limited, but may be more extensive in scope so as to include other arrangements of the bearing and the complementary mating surfaces and to include other applications other than bearings.

Conventional roller or ball bearings in their many and varied forms usually consist of an inner race member which is fixedly located to a rotatable shaft, so as to rotate in accordance with corresponding rotation of the shaft, an outer race member which is fixed to a stationary element, and balls or rollers held in position by a cage or flanges or the like located intermediate the inner and outer race members. The balls or rollers provide relative rotation of the inner and outer race members with respect to each other. Usually, the side of the ball bearing or roller bearing presents cavities or depressions because of the wavy shape of the cage surrounding the balls or rollers.

One problem associated with conventional ball or roller bearings in their many forms is that when damaged or at the end of their useful life the bearings cannot be repaired in situ or in the field but must be replaced with an entirely new bearing. In many instances where the inner race is fixedly connected to a shaft, the removal of the bearing requires considerable effort, expense and equipment. The present invention, on the other hand, provides a bearing construction that allows the bearing to be completely disassembled in situ or in the field, the worn component or components may then be replaced and bearing reassembled thus obviating the need to replace the whole bearing which is costly and time consuming.

Another problem associated with conventional ball or roller bearings is that all of the components are manufactured from metal and there is metal-to-metal contact between these components such as between the races and balls or rollers and between the balls or rollers and the cages. This metal-to-metal contact causes the bearing components to gall, develop flat spots, rust and the like thus reducing the useful service life of the bearings. The present invention, on the other hand, provides a bearing or bearing assembly having one component made from a plastics material so that there is no metal-to-metal contact. In other embodiments a sandwich-like construction for the bearings is possible in which there are components alternatively made from metal and plastics arranged so that there is no metal to metal contact.

Another problem associated with previously available roller or ball bearings having a plastic component is that externally located locating means such as for example a spaced apart pair of opposed collars must be provided for accurately locating the bearing on the shaft and to retain the bearing components in place. Usually two external collars are provided, one on either side of the bearing, to locate the outer race with respect to the inner race when on the shaft at the desired preselected position. In use of the bearing, the components frictionally slide past each other which generates heat thus causing a heat build-up in the bearing. As the bearing becomes hotter the components expand radially outwards and axially outwards. Since there is only minimal clearance between the external collars and the bearing, the bearing quickly expands against the collars which increases the heat generated within the bearing as the bearing rotates against the rollers which ultimately leads to the bearing seizing. In prior art bearings having a plastic component, the heat generated in some cases causes the plastic to melt thus destroying the bearing. The present invention by being provided with an internally located locating means which is integral with the bearing, on the other hand, does not seize when it expands due to heat build up since the locating means also expands. The internally located locating means may be separate from or form part of the bearing surface.

Another problem associated with conventional bearings, particularly those bearings having a plastic component which is fixed relative to a moving part of the bearing is that they require trained personnel to fit replacement bearings and locating means. In the field when a bearing or bearing assembly is being replaced it is a matter of judgement on the part of the serviceman to adjust the tolerances of the external collars. Too little clearance will cause the bearings to run hot thus substantially reducing their useful service life. Too much clearance will result in the bearing having too much play which leads to premature wear. Thus, the serviceman needs to adjust the locating collars to within quite limited tolerances. The present invention, on the other hand, has the locating means machined to strict tolerances in the factory. Since there are no external locating collars required, the serviceman is not required to exercise any judgement and thus there is no element of human error in assembling or replacing the bearings in the field.

A further problem associated with conventional ball and roller bearings is that chemical, physical and biological contamination may find its way inside the bearing or assembly because conventional bearings are more or less open and have cavities, recesses and the like on the exterior side surfaces. Contamination in the form of dust particles, water, bacteria and the like leads to the bearing surfaces becoming rusted or corroded which, in turn, reduces the service life of the bearings. Because the bearing surfaces of the present invention are protected from and not exposed to the environment and are essentially smooth on the outside there is a very much reduced possibility that the bearings of the present invention will be contaminated.

Another problem associated with conventional metal bearing assemblies relates to the housings, for the bearings for example cast iron bearing housings, metal bearing housings develop rust, corrosion bacterial contamination or the like within the cavities thereof during prolonged use. The development of such contaminations are undesirable in the food industry, such as in meat processing plants, dairies, pharmaceutical industries and the like since the food product may be contaminated which leads to premature spoilage and wastage.

It is therefore one object of the present invention to provide corrosion-resistant bearings, housings and components by manufacturing such articles either wholly or partially from polymeric plastic materials. In particular it is an aim to provide plastic plummer blocks, pillow blocks, flanged housings, cylindrical flat bearing and the like.

In one form the present invention relates generally to commercial bearings for driver shafts and driven shafts and more particularly concerns the replacement of all-metal bearings and housings with a bearing having at least one portion made from synthetic polymeric materials or the matching up of metal bearing surfaces against bearing surfaces of plastic polymeric materials.

The invention, according to one general aspect may therefor reside in commercial structural bearing components and assemblies of metal and synthetic, polymeric materials, interchangeable with conventional all-metal bearings and bearing housings. The bearings of the present invention eliminate the need for having balls or rollers of any form located between the bearing races.

Typically, one form of the present invention relates to a bearing housing which is moulded or fabricated from a glass-filled thermoplastic, polyester resin and another form of the present invention relates to a bush which is optionally locatable inside the housing being moulded or fabricated from the same, or a different synthetic, polymeric thermoplastics resin material as the housing. Additionally, the present invention relates to a bearing assembly in which all of the components are made of plastics material, such as the housing, bush and sleeve.

The invention, according to another aspect may also reside in a stationary bearing bush of synthetic polymeric material for the above described bearing housing which bush incorporates or houses, a rotatable inner cylinder sleeve, typically made from a corrosion proof metal, such as stainless steel. The sleeve of this form of the present invention may be equated to the inner race of a conventional ball or roller bearing. The bush of the bearing of the present invention may be equated to the outer race of a conventional bearing.

According to the present invention there is provided a bearing for a shaft or the like, comprising a first bearing member adapted to be fixedly connected to the shaft so as to rotate in accordance with rotation of the shaft, a second bearing member including at least two rings adapted to be assembled in face to face relationship, said second bearing member adapted to remain substantially stationary in use, said first and second bearing members having complementary engaging portions for facilitating location of the two bearing members with respect to each other and to facilitate rotation of the two bearing members with respect to each other.

It will be especially noted that the bush and sleeve assembly of the invention replaces ball bearing races and eliminates the need for, and cost of ball bearings, cages, roller bearings and the like and can replace cast iron bearing housings with plastic bearing housings.

This invention also relates generally to substitutes for or replacements for roller bearings and the like and relates in particular to a bearing assembly of mated components of metal and synthetic polymeric materials which is adapted to replace, or is interchangeable with conventional steel-type track cam followers which use roller or needle type bearings.

A modification to the bearing of the present invention is a cam follower which includes a split-segment bearing bush coupled upon an inner sleeve assembled within an outer ring which forms a running surface member without roller or needle type bearings. The split-segment bush is retained on the flanged, central or inner sleeve by a suitable fastening member.

The concept of this invention also extends to double ball-race type, optionally self-aligning ball bearings wherein the ball bearings and race are replaced by a split-segment bush/sleeve sub-assembly fitted into a flanged sleeve.

Accordingly, the invention also resides in replacement of a double ball-race type, self-aligning bearing with a bearing comprising a split-segment bearing bush/sleeve wherein the bearing bush segments are assembled upon a flanged sleeve prior to fitment within a bearing housing and the bush is mounted internally with an annular ring.

More particularly and preferably, the split-segment bearing bush is fabricated or moulded from a synthetic polymeric material or materials, such as an unreinforced, partially crystalline, thermoplastic polyester, for example polyethylene terephthalite.

Materials from which the components of the present invention may be made are plastics, ceramics, glass, pure carbons, carbon fibres, graphite impregnated materials, kevlar, or the like including combinations thereof.

Typically, the first bearing member is an inner race or a sleeve which is fixedly attached to a rotating element, such as a shaft for rotation therewith.

Typically, the second bearing member is an outer race or a bush which is fixed stationary to the inner race member.

The outer race or bush is typically a pair of annular rings formed by being radially split apart.

Typically, each ring is provided with a rebate, shoulder, recess or groove located circumferentially around the ring. More typically, the rings when in face to face relationship have their respective rebates or the like abutting one another to define a groove or the like in which a complementary shaped male member provided on the inner bearing member rotates.

Another form of the bearing structure of the present invention in its assembled state may comprise a fixed outer housing of a glass filled, thermoplastic, polyester resin; a self-aligning, non-rotatable outer bearing member, an intermediate member of hardened synthetic, polymeric material, adjustably fixed within the housing or outer bearing member and an inner rotatable, bearing member or the like.

Typically, the bore of the housing has a segmented surface which is concavely curved, the outer surface of the self-aligning bearing member being circumferentially, convexly curved with a surface curvature corresponding to the curved surface of the housing, both surfaces being formed of different synthetic, polymeric material.

More particularly, the bush comprises two mating segments, each segment being in the form of a cup having a convexly curved, external circumferential face and an internal stepped face, the external, convexly curved face of each segment forming a circumferentially convex, self-aligning surface with a concavely curved, internal circumferential face of a bearing housing when the bush is mounted in the bearing housing, the internal stepped portions being adapted to be coupled onto a circumferential flange of an inner bearing member such as for example on a stainless steel sleeve before mounting the coupled bush and sleeve into a bearing housing.

The invention may also comprise a method of manufacturing a bearing assembly which comprises coupling two identical, internally stepped mating segments of a bearing bush of synthetic, polymeric material onto a cylindrical sleeve, the sleeve having a circumferential flange thereon adapted to fit within an internal, annular recess formed by the coupled bush segments. Typically the coupled bush segments define an external, circumferentially convex surface which may be fitted into internally, concavely curved circumferentially surface segments of a bearing housing of the same or different synthetic, polymeric material as the bush.

Typically, the inner bearing member may be provided with either a male portion or a female portion of the complementary shaped matingly engaging means of the bearing of the present invention. The outer bearing may therefore be provided with a corresponding female or male portion. Typically, the male portion is a flange. The flange may be square, rectangular, curved, dove-tailed or the like in cross-section or it may have any suitable, desirable or convenient section or combination of sections such as straight sides and a curved end. The female recess or groove is complementary to the male flange within fine tolerances since the male flange rotates in the female groove in use to locate the inner bearing with respect to the outer bearing and provide a further bearing surface.

The flange may extend to any width relative the width of the bearing from being almost the width of the bearing to being a very thin lip. The inner bearing may be made from metal or plastics material and the outer bearing may be made from metal or plastics materials. Both the inner and outer bearing may be of plastics materials.

Typically, there is one, two, three, four or more flanges and a corresponding number of recesses or grooves. Typically, where more than a single flange is provided, the flanges may be of the same thickness and profile or may be of different thickness and different profiles. Preferably, the flange is a paired or double flange, each flange spaced apart from the other.

Typically, there may be two, three, four or more split rings, each of the rings being located in use in face to face relationship with each other.

Typically, the rings may be axially split in some embodiments either, such as for example as bearing shells, in place of being radially split or in addition to being radially split. Thus the rings may be annular or semi-circular.

Typically, the flanges may be continuous or discontinuous having cut-outs, recesses, grooves or the like associated with them. Additionally heat dissipation means may be provided on the flanges such as fins, flutes threads or the like. One form of the heat dissipating means of the present invention is a spiral or helical groove or ridging in the side surfaces of the flange. The depth of the helical or spiral groove or ridging being very small compared to the height of the flange. Typically, the bearings of the present invention may be rigid bearings or may be self-aligning bearings, or may be radial load bearings or thrust or axial load bearings.

Typically the bushes or outer race members of the present invention may be provided with integral fixing means for fixing the rings directly to a substrate or housing or other part of the machinery having the bearings thereby obviating the necessity in some applications of having a separate housing. Thus, the rings need not be annular but may adapt any shape but have an annular or circular portion.

Some examples of practical arrangements of the invention will now be described with reference to the accompanying drawings in which:

FIG. 1 is a perspective exploded view of the components of one form of the bearing of the present invention;

FIG. 2 is a partial cross-section taken along the line 2 to 2 of FIG. 1;

FIG. 3 is a partial cross-section and partial side elevation view of the bearing of FIGS. 1 and 2 assembled together to form a bearing;

FIG. 4 is a perspective view of one form of the bearing housing of the present invention, in which a bearing of the self-aligning type according to the present invention has been inserted;

FIG. 5 is a front elevation of the housing of FIG. 4 showing the bearing in its normal in use position in solid lines and rotated through 90° into a position for removal from the housing shown in phantom;

FIG. 6 is a cross-section view along the line 6 to 6 of FIG. 5;

FIG. 6a is a perspective view of one form of the housing with the bearing assembly removed;

FIG. 7 is a perspective view of a second embodiment of a bearing assembly according to the invention and also showing the bearing in a position rotated through 90° for removal in phantom;

FIG. 8 is a cross-sectional view along the line 8 to 8 of FIG. 7;

FIG. 9 is a cross-sectional view of a further embodiment of the invention; and

FIG. 10 is a cross-sectional view of a further embodiment of the present invention.

Referring to the drawings, there is shown in FIG. 1 the components of a simple form of the bearing 2 of the present invention. This simple form comprises a sleeve or inner race member 4 and a bush component or outer or fixed bearing race member 6. The bush or outer bearing race member 6 comprises a split-segment bush or split ring comprising two mating segments or rings 10, 11 of synthetic polymeric, thermoplastic resin material, such as that marketed under the trade mark VESCONITE, of Vesco Plastics Pty. Ltd. However, it is to be noted that any suitable, desirable or convenient material may be used to manufacture rings 10, 11. Each ring 10, 11 has a convexly curved outer face 12, 13, respectively and an inner stepped face 14, 15 respectively. The two rings are adapted to matingly abut together in face to face relationship to form a couple which is the outer bearing race member 6 within which the rotatable bearing sleeve 4 rotates. Bearing sleeve 4 which corresponds to the inner, rotatable, first bearing race of a conventional bearing and is preferably made of stainless steel has a circumferential flange 17 located intermediate its side edges. However, it is to be noted that sleeve 4 may be made of any plastic material or metal. Flange 17 is adapted to nest within the bearing surface provided by annular groove 18 formed from the inner stepped faces 14, 15 matingly being together, located in the inboard surface of the two rings when coupled together onto the sleeve, as shown in FIG. 3.

Although a square section flange or one nearly so is shown in the drawings it is to be noted that the flange may take any convenient, suitable or desirable shape such as for example square, rectangular, curved, lip-like or a combination thereof such as being straight sided with a rounded end. Of course the groove 18 formed from the stepped edges being matingly brought together will have a profile complementary to the profile of the flange. A preferred form of the flange has slightly rounded edges around the peripheral edges. Additionally, any number of flanges may be provided along the wall of sleeve 4 at regularly or irregularly spaced apart locations. Of course, a corresponding number of grooves will be formed by the split rings. Although only two split rings are illustrated it is to be noted that any number of split rings all in face to face relationship may be provided.

Referring to FIGS. 4 to 6 of the drawings, there is shown a bearing similar to that of FIGS. 1 to 3 located within a housing 20. The housing in the illustrated embodiment is in the form of a plummer block. However, the housing may take any form such as a pillow block, flange block or the like or the outer bush 6 of the bearing may in other embodiment be provided with integral fixing means to act as its own housing.

The bush 6 defined by the two split rings is provided with an outer convex surface since the outer surface of each ring 12, 13 is convexly curved with the largest external diameter located against the adjacent ring and the smallest external diameter located around the sides of the bearing. The convex outer surface of the assembled bush is designed to fit within and be retained by a complementary shaped internal concave circumferential surface 31 of the bearing housing 20. The bearing housing 20 is also moulded or fabricated of a synthetic, polymeric material such as a thermoplastic, polyester resin, preferably filled with glass or glass fibre, for example VALOX 420 grade resin made by General Electric Company. A drive or driven shaft (not shown) may then be placed through the assembled bearings.

For high speed applications a grease nipple (not shown) is optionally provided for lubricating the bearing surface.

Referring to FIGS. 4 to 6a of the drawings, which the bearing assembly comprises bearing housing 20, an inner race member or sleeve 4 and bush 6 The bush 6 is provided with an outer convex surface 12, 13 and is made by two as symmetrical split rings 11, 10 matingly abutted together. Each of the rings outer surface is curved. The inner segmented and concave surface 31 of the bore of the bearing housing 20 has continuous peripheral edge forming a closed front wall 23 and a partly or segmented open rear wall 24 formed by a peripheral edge which is interrupted on either side in vertical arcs extending for equal distances above and below the horizontal notional centre-line through the housing to form gaps of wider bore diameter than the rest of the housing or cut-outs. The gaps or cut-outs extending laterally axially midway into the bearing to form two identical slots 25, 26 tapering in radii from top to bottom and opening to the rear face of the housing whereby the bearing and bush assembly as a unit may be removed from the housing by swivelling the bearing and bush 90° about the horizontal axis thereof as shown in phantom in FIGS. 5 and 6 and then moving the bearing and bush unit linearly out of the bearing via the slots, or conversely inserted into the housing, by moving the bearing bush unit linearly into the housing via the open rear wall slots while in a horizontal position. Then, turning the unit through 90° while the unit is in the housing.

In an alternative construction of the bearing housing and bearing bush according to the invention (not shown), the outer circumferential surface or surfaces of the bearing bush may be flat instead of convex and the inner circumferential surface of the bearing housing may also correspondingly be flat, instead of concave and the bearing bush is then locked into the bearing housing with peripheral collars on each side thereof.

With particular reference to FIGS. 7 and 8 a further embodiment of the present invention which is a double race bearing will now be described.

The double race bearing assembly 30 comprising the split-segment bearing bush 34 and the flanged stainless steel sleeve 32 is mounted within the outer stainless steel running surface ring 36 in a similar manner to that used to mount the bearing bush and sleeve into the plastic bearing housing shown in FIGS. 4 to 6 and in FIG. 6a of the accompanying drawings. The inner circumferential surface 31 of the running surface ring of the present invention/modification is segmented in an angular direction and also tapered and concavely curved in the same direction. The bearing bush and sleeve assembly is mounted within the outer ring member by moving the assembly in a horizontal direction while in a horizontal position until it is inside the ring and then turning the assembly into a vertical position when inside the ring in a manner similar to that as described earlier with respect to bearing housing 20.

This modification will now be described in more detail. The ring-shaped, bearing housing 36 is made of "316" stainless steel and has identical flat side walls 41, 42, a flat outside face 43 having a central shallow circumferential groove 44 therein which extends completely around the external surface thereof. The ring 36 has a concave, internal, circumferential surface 45 interrupted by diametrically opposed radial segment bearing, bush-receiving access slots 46, 47, extending radially, partly into the internal, circumferential, concavely-curved surface of the housing. The slots are formed by portions cut-away from one side wall only of the housing and referring to one of the slots 46, the slot has its axially, inwardly boundary wall formed into a V-ramp to facilitate assembly of the convexly-curved external surface of each of the mating bearing bush segments 35, 37 which are preferably fabricated from a synthetic polymeric material such as FECHNAPLAS. The bushes 35, 37 are assembled onto the stainless steel sleeve 32 in abutment with the central, external flange 17 of the sleeve 32 by preventing the bush/sleeve bearing sub-assembly from being inserted axially too far into the housing at right angles thereto before the bush/sleeve sub-assembly is rotated 90° about its diametric axis of symmetry within the concave, walled housing and then aligned with the housing. Referring back to the housing slot 46, the slot is formed by removing an inner edge 47 of the housing and forming a flat floor 48 with curved radial side walls 49, 50, extending axially part-way into the housing and a substantially straight front edge 51.

Referring to FIG. 8, the bore 52 of the sleeve may be tapered as shown, or straight - that is say cylindrical, or of uniform internal diameter in an axial direction.

In FIG. 9 is shown a further embodiment in which the sleeve 60 of the bearing is split and is provided with a circumferential groove 62 and the bush 64 is provided with a flange 66 for rotation with groove 62. In this embodiment bush 64 is split axially rather than radially and takes the form of bearing shells or the like. A housing or outer ring 68 may optionally be provided to surround bush 64.

A further embodiment of the present invention being a cam follower will now be described with reference to FIG. 10. In FIG. 10 is shown a cam follower bearing assembly 80 comprising a split-segment bearing bush, the two identical mating components of which are rings designated 81, 82 and which are fabricated from the same moulded or hardened synthetic polymeric material such as carbon, carbon fibre, or graphite impregnated, glass fibre or chopped strand reinforced polyester resin. Each of the rings is coupled onto a flanged cylindrical metal sleeve 83 which can be made from stainless steel via the internally stepped portions 84, 85 of the bush segments 81, 82 which fit into the integral circumferential flange 86 of the sleeve 81. An outer, stainless steel ring 87 with external track-running surface 88 providing a track cam follower surrounds the bush. The track cam follower 88 is provided with a concavely curved inner surface 89 of complementary shape to each convex outer surface of each split-segment of the bearing bush 81, 82. The assembled bearing components of bush and sleeve after assembly within the outer ring running surface member 87 are retained together in locked configuration by a fastening member which, in this particular example is a solid, enlarged headed bolt 90 which can have the protruding shaft thereof provided with various suitable alternative fastening means thereon such as a press-fit locking member such as a washer 91 or nut or the solid shaft of the head nut can be drilled for retaining in a bearing by a grub screw or by grub screws 120, Allan screws or the like (not shown). The bolt 118 can have a plain or threaded end.

Advantages of the bearing of the present invention include that the bearings run quieter than conventional all metal bearings. The reduction in noise is particularly apparent in situations where a large number of bearings are used, such as for example in indoor conveyor systems where each roller of the conveyor system has at least two bearings. The overall reduction in noise in enclosed environments is desirable because of the health and safety problems encountered when using large numbers of all metal bearings in confined spaces.

A further advantage resides in the male/female matingly engaging means of the bearing members which is used to locate the two bearing members with respect to each other and to provide an increase in bearing surface without increasing the external dimensions of the bearing assembly.

The bearing is resistent to corrosion, rust, contamination and the like because the external surfaces are relatively smooth and the locating means and bearing surfaces, being located internally within the bearing are not exposed to the outside environment.

The claims defining the invention are as follows:

1. A self aligning bearing for a shaft, said bearing including:
   first bearing means in the form of a bearing sleeve adapted to be fixedly mounted onto the shaft, said sleeve including on its outer bearing surface a continuous annular flange,
   second bearing means consisting essentially of a pair of mutually abutting annular bearing rings rotatably mounted on said bearing sleeve, said rings being disposed one on either side of said flange, each of said bearing rings including an annular recess, said recesses abut each other to form an annular groove to accommodate said flange thereby to limit relative axial movement between said first and said second bearing means whilst allowing relative rotation between said first and said second bearing means with the bearing surface being the surface contact between said sleeve and said rings, the outer surface of said abutting bearing rings being circular in radial cross-section and convex in axial cross-section, and
   an outer bearing member surrounding the outer surface of said bearing rings to retain the rings therewithin, including a concavely shaped inner surface complementary to the outer surface of said bearing rings whereby said rings may pivot relative thereto to allow the bearing to align with the shaft and, when said bearing is not located on the shaft, to allow said rings to be pivoted to a position with their axis substantially perpendicular with the axis of the outer member,
   said outer member including a pair of diametrically opposed slots on the inner surface thereof to allow said second bearing means and first bearing means to be removed from the outer member when in said pivoted position.

2. A bearing according to claim 1, wherein the said bearing is removably mounted on said shaft and adapted to be subsequently fixed thereto.

3. A bearing according to claim 2, wherein the said bearing sleeve protrudes from said second bearing means, the protruding portion of the sleeve being provided with fastening means for fixing the sleeve to the shaft.

4. A double race bearing for a shaft including:
   first bearing means in the form of a bearing sleeve adapted to be fixedly mounted onto the shaft, said sleeve including on its outer bearing surface a continuous annular flange,
   second bearing means consisted essentially of a pair of mutually abutting annular bearing rings rotatably mounted on said bearing sleeve, said rings being disposed one on either side of said flange, each of said bearing rings including an annular recess, said recesses abut each other to form an annular groove to accommodate said flange, thereby to limit relative axial movement between said first and said second bearing means with the bearing surface between said first and second bearing means being the surface contact between said sleeve and said rings, the outer surface of said abutting bearing rings being circular in radial cross-section and convex in axial cross-section, and
   an outer bearing member surrounding the outer surface of said bearing rings to retain the rings therewithin, including a concavely shaped inner surface being complementary in shape to the outer surface of the said rings, said inner surface providing a running surface facilitating relative rotation between said second bearing member and said outer bearing member, and wherein the rings may pivot to allow the bearing to align with the shaft and, when said bearing is not located on the shaft, to allow said rings to be pivoted to a position with their axis substantially perpendicular with the axis of the outer member,
   said outer bearing member including a pair of diametrically opposed slots on the inner surface thereof to allow said second bearing means and said first baring means to be removed from the outer bearing member when in said pivoted position.

5. A bearing according to claim 4, wherein the first and second bearing means are retained together in locked configuration by a fastening member.

6. A bearing according to claim 4, wherein said bearing is removably mounted on said shaft and adapted to be subsequently fixed thereto.

7. A bearing according to claim 6, wherein said bearing sleeve protrudes from said second bearing means, the protruding portion of the sleeve being provided with fastening means for fixing the sleeve to the shaft.

* * * * *

UNITED STATES PATENT AND TRADEMARK OFFICE
CERTIFICATE OF CORRECTION

PATENT NO. : 5,219,231
DATED : June 15, 1993
INVENTOR(S) : Noel F. Sheedy

It is certified that error appears in the above-indentified patent and that said Letters Patent is hereby corrected as shown below:

On the Title Page, under the Heading [73] Assignee: change "Plastic Bearing Housing Australiasia PTY Ltd., Doreen, Australia" to -- Plastic Bearings & Housings Australasia Pty. Ltd., Doreen, Australia --

Signed and Sealed this

Twenty-fourth Day of May, 1994

Attest:

BRUCE LEHMAN

Attesting Officer    Commissioner of Patents and Trademarks